United States Patent [19]

Himmelstein

[11] 3,965,036

[45] June 22, 1976

[54] REGENERATION OF ACTIVATED CARBON WITH A SOLUTION OF SORBED SPECIES IN A SOLVENT

[75] Inventor: Kenneth J. Himmelstein, Midland, Mich.

[73] Assignee: The Dow Chemical Company, Midland, Mich.

[22] Filed: July 23, 1974

[21] Appl. No.: 491,017

Related U.S. Application Data

[63] Continuation of Ser. No. 313,771, Dec. 11, 1972, abandoned.

[52] U.S. Cl. .................................. 252/414; 210/32; 210/39; 210/40; 252/413; 260/525; 260/541; 260/621 A; 260/627 R; 260/643 G

[51] Int. Cl.² ...................... B01D 15/06; B01J 21/20

[58] Field of Search ................... 252/412, 413, 414; 210/32, 33, 39; 260/499, 541; 208/305, 310

[56] References Cited
UNITED STATES PATENTS

| | | | |
|---|---|---|---|
| 2,177,473 | 10/1939 | Brant | 260/499 |
| 2,599,545 | 6/1952 | Egan et al. | 210/64 |
| 2,621,149 | 12/1952 | Scott, Jr. et al. | 208/310 |
| 2,761,822 | 9/1956 | Addison | 208/310 |
| 2,797,190 | 6/1957 | Scott, Jr. et al. | 208/310 |
| 2,967,148 | 1/1961 | Karnofsky | 208/310 |
| 3,730,885 | 5/1973 | Makrides et al. | 210/30 |
| 3,766,090 | 10/1973 | Jungten et al. | 252/412 |

Primary Examiner—Winston A. Douglas
Assistant Examiner—P. E. Konopka
Attorney, Agent, or Firm—Bruce M. Kanuch

[57] ABSTRACT

Solvent regeneration of activated carbon on which a chemical species is sorbed is enhanced by the selective use of a regenerant solution containing a solvent for said chemical species and a predetermined concentration of the chemical species in solution. The stream of spent regenerant coming from the carbon is thereby made more concentrated in solute and easier to treat for separation of the solute and solvent.

10 Claims, No Drawings

REGENERATION OF ACTIVATED CARBON WITH A SOLUTION OF SORBED SPECIES IN A SOLVENT

CROSS-REFERENCE TO RELATED APPLICATION

This is a continuation of application Ser. No. 313,771 filed Dec. 11, 1972, now abandoned.

BACKGROUND OF THE INVENTION

The present invention relates broadly to the regeneration of activated carbon. More specifically, the invention pertains to solvent regeneration of activated carbon by the selective use of a regenerant solvent containing in solution the same chemical species which is sorbed on the carbon.

Activated carbon is widely used in industry as an agent for recovery, removal, and purification of broadly ranging chemical species from a fluid stream. In the normal use of activated carbon chemical species build up on the carbon causing a progressive reduction in the carbon's ability to remove additional chemicals from a fluid. Therefore, at certain intervals the carbon is regenerated, i.e. purged of a substantial portion of the adsorbed chemicals.

There are four general methods of carbon regeneration in current use: solvent wash, acid or caustic wash, steam reactivation, and thermal regeneration. Use of a solvent or acid or caustic wash is practiced by passing the solvent or wash through the carbon bed until the sorbed chemical species are removed. The carbon bed is drained of the solvent or wash to prepare the bed for reuse. Solvent regeneration can be unfeasible because very large amounts of solvent must be employed to recover the sorbed species from the bed and the large quantity of solvent must then be treated to recover the chemical species from the solvent. Acid or caustic wash forms a salt on the carbon bed which may be difficult to remove and to later separate from the solution.

Chemical species with low boiling temperatures can in certain cases be removed from carbon beds by steam. Typically 3-5 pounds of steam per pound of chemical species must be passed through the carbon opposite to the normal flow direction, and is vented to the atmosphere or condensed and recovered. The generation of live steam and condensation or other disposal of spent steam in the quantities required for steam regeneration is not economical. Also, the steam usually condenses to some extent into water, which dilutes the stream of chemical species recovered and increases the amount of distillate required to be treated.

The method most widely used today is thermal regeneration, which involves three basic steps: drying; baking or pyrolysis of chemical species; and activating, by oxidation of the carbon residues remaining after the baking step. This method requires drying temperatures of at least 212°F., baking temperatures between 212° and 1500°F., and activating at a carbon temperature in excess of 1500°F. The use of the high temperatures required in thermal regeneration is disadvantageous in that as much as 10 percent of the carbon may be lost in the regeneration cycle. Furthermore, large quantities of heat and special ovens must be provided to accommodate the heating. Also, time and efficiency are lost when the activated carbon is removed from the adsorber, conveyed to the oven, regenerated, reconveyed to the adsorber, and finally reinstalled.

SUMMARY OF THE INVENTION

Activated carbon containing prior sorbed chemical species is contacted with a regenerant solution composed of a solvent for the chemical species and in solution a predetermined concentration (below saturation) of the chemical species. The spent regenerant solution recovered from the activated carbon is either treated for the separation of solvent and chemical species or is selectively fractionated into two or more fractions. One of said fractions is treated for solvent and chemical species separation; the other fraction or fractions are combined with additional solvent and recycled for further regenerating of the carbon.

DETAILED DESCRIPTION OF THE INVENTION

Solvent regeneration of activated carbon was thought to require the use of a solvent free of or containing only a minute concentration of other chemical species dissolved therein. It was believed that the presence of more than a trace amount of other chemical species would severely impair the solvent's ability to desorb similar or the same chemical species from the activated carbon.

Contrary to these expectations, it has been discovered that a solvent containing a substantial concentration of the chemical species to be removed from the carbon is as effective as a solution containing only trace amounts of the chemical species. For example, acetic acid was sorbed onto a bed of activated carbon from a 0.5% aqueous solution. Regeneration of the bed with pure ethyl acetate produced a stream of spent regenerant containing 17.8 g/liter (L.) of acetic acid. Use of a regenerant solution containing 50 g/L. of acetic acid ($\approx 5\%$) produced a spent regenerant stream containing 68.7 g/L. of acetic acid, thus removing a slightly greater amount of acetic acid than that removed by the use of pure ethyl acetate. A regenerant stream of 10% acetic acid in ethyl acetate was found to remove essentially the same amount of acetic acid as the pure ethyl acetate.

The present method of utilizing a regenerant solvent containing a predetermined concentration of chemical species corresponding to that sorbed on the carbon bed is usable to regenerate carbon containing a broad variety of carbon sorbable chemical species utilizing a wide variety of solvents. The chemical species sorbed on the carbon should be soluble in some usable solvent. The solvent must be able, upon contact with the carbon, to dissolve and remove the chemical species therefrom. For example, chemical species such as phenols aliphatic and aromatic acids, alcohols, and most organic solvents for the given desorbed solutes are within the ambit of the present method. A carbon bed upon which acetic acid was sorbed as the solute was successfully regenerated by the use of acetone, ethyl acetate, or methanol.

Although beneficial results are obtained by using even a small concentration of chemical species in the solvent, it is preferred to employ a solvent which contains a concentration of the sorbed chemical species which is equal to the maximum concentration of the sorbed species in the solent that would remove essentially as much of the sorbed chemical species per unit volume thereof as would a unit volume of pure solvent. This concentration is found to depend on the characteristics of the carbon bed, the flow rate during regeneration, and the solubility of the sorbed chemical species in the solvent. The optimum concentration is determined experimentally, or may be estimated by use of the formula:

$$x \leq a - (b/c)$$

where
 $x$ = the estimated optimum concentration of the chemical species in the regenerant solution,
 $a$ = the solubility of the chemical species in the solvent,
 $b$ = the amount of the chemical species sorbed on the activated carbon, and
 $c$ = the quantity of solvent to be passed through the activated carbon.

The concentration thus predetermined is utilized for the regeneration operation.

Such parameters as temperature of the carbon during the solvent regeneration, regenerant flow rate, and construction of the activated carbon bed may be determined by reference to the existing art of carbon regeneration. For example, see Culp and Culp, *Advanced Wastewater Treatment*, Van Nostrand Reinhold Co., New York, 1971, and Smisek and Cerny, *Active Carbon, Manufacture, Properties, and Applications*, Elsevier Pub. Co., Amsterdam, 1970.

A useful embodiment of the present invention involves the selective fractionation of the spent regenerent solution recovered from the activated carbon during the regeneration cycle. This solution is separated into two or more portions as a function of the concentration of chemical species contained in the solution which is being removed from the activated carbon. A portion of the solution which is relatively rich in solute is easily treated, e.g. by distillation, to separate the chemical species and the solvent. The portion or portions containing a low concentration of chemical species is combined with additional solvent, if necessary, to produce a regenerant solution containing an optimum chemical species concentration as determined by the method previously defined hereinbefore.

The concentration level to be employed in determining the point at which fractions of the spent regenerant flow from the carbon are to be separated and the choice of the number of fractions to be separated can be predetermined in any suitable manner. For example, it is known that the concentration of the chemical species in any given fraction depends on the total amount of spent regenerant which has been removed from the carbon. The concentration of the chemical species in the spent regenerant solution is found, as a function of the amount of solution flow, to increase rapidly to a peak and then to decrease again. The first portion of the spent regenerant solution is preferably further processed to separate the chemical species therefrom. Shortly after the peak concentration is passed, the flow desirably is diverted, e.g., into a holding tank.

The first fraction is conveyed to a separation means in which the chemical species is separated from the solvent.

That part of the flow which follows after the peak concentration level (that which is relatively weak in solute concentration) is conveyed into a holding tank preparatory to combining with it an appropriate amount of solvent to produce a regenerant solution containing a desired concentration of chemical species. This "fresh regenerant" is reused to further regenerate the activated carbon.

Prior to using the regenerated carbon bed for further sorption, the solvent is purged from the bed by contact with hot gas, steam, rinsing solvent, or by any other method of removing a substance from carbon.

The advantage of the present invention is the greater ease of separation of chemical species from the employed to solvent regenerate the carbon bed. For example, if separation is effected by distillation, the amount of solution required to be distilled to remove a given amount of chemical species can be reduced in some cases by 85%, as seen in the following examples.

EXAMPLES

Example 1

In this example, the usual method of solvent regeneration of activated carbon was tested. That is, a carbon bed containing 100 grams of Witco 718 brand activated carbon in a column 1 inch in diameter and 24 inches long was loaded with 14.3 grams of acetic acid. The carbon bed was contacted with 800 ml. of pure ethyl acetate at a flow rate of 10 ml./min. 10.6 grams of acetic acid was removed, and approximately 200 ml. ethyl acetate remained in the carbon bed. The average concentration of acetic acid in the ethyl acetate was 17.8 g./liter. One liter of ethyl acetate must be distilled to recover 17.8 g. of acetic acid. One liter of ethyl acetate weighs 894.5 g. at ambient temperatures. Thus 17.8 g. of acetic acid is obtained by the distillation of 894.5 g. of solution; this results in the requirement that 50.2 g. of solution be distilled for each gram of acetic acid recovered.

Example 2

In this example, one embodiment of the present invention was practiced. A carbon bed containing 100 grams of Witco 718 carbon was again loaded with 14.3 grams of acetic acid. The carbon was contacted with 800 ml. of ethyl acetate containing 50 g./L. of acetic acid. The average concentration of 600 ml. of spent regenerant solution recovered from the carbon bed is 68.7 acetic acid per liter of ethyl acetate. This solution is separated into two fractions, 436 ml. and 164 ml. The 436 ml. fraction can be diluted with 164 ml. ethyl acetate to form 600 ml. of a solution of 50 g./L. acetic acid in ethyl acetate and is appropriate for further contacting with the carbon to be regenerated. The 164 ml. fraction has a concentration of 68.7 g./L. acetic acid in ethyl acetate and may be treated for separation of ethyl acetate and acetic acid. Due to the higher concentration of acetic acid in the ethyl acetate, i.e. 68.7 g./L. c.f. 17.6 g./L., only 13.0 gram of solution must be distilled to recover one gram of acetic acid. In Example 1, 50.2 grams of solution had to be distilled to recover one gram of acetic acid.

Example 3

In another embodiment of the invention a 600 ml. quantity of spent regenerant recovered from the carbon bed is selectively fractionated. A first 100 ml. fraction containing 130.8 g./L. of acetic acid is separated from the spent regenerant stream. A second fraction of 500 ml. of spent regenerant is also recovered containing 53.3 grams of acetic acid per 1 liter of ethyl acetate. The 100 ml. first fraction is separated into one portion of 74.3 ml. and another portion of 25.7 ml. To the 25.7 ml. portion of the first fraction is added 74.3 ml. pure ethyl acetate and the 500 ml. second fraction to give 600 ml. of a solution containing 50 g./L. of acetic acid in ethyl acetate which is, conveniently, the same amount of solution that was taken off the carbon bed. This solution may be recycled to further contact the activated carbon.

The 74.3 ml. portion of the first fraction contains an acetic acid concentration of 130.8 g./L. Separation of acetic acid from and the ethyl acetate in this portion requires the distillation of only 6.85 grams of solution to recover 1 gram of acetic acid.

What is claimed is:

1. In a method of recovering a sorbed organic compound from the group consisting of aliphatic acids, aromatic acids, alcohols and phenols from activated carbon by contacting said carbon with an organic solvent for said compound, the improvement which comprises:

employing as the solvent a solution containing a concentration of said compound in said solvent, said concentration being equal to the maximum concentration of said compound in said solvent which removes essentially as much of said compound per unit volume thereof as would a unit volume of pure solvent, wherein said concentration is calculated by the formula $X = a - b/c$, wherein $X =$ the concentration of the sorbed compound in the solvent, $a =$ the solubility of the sorbed compound in the solvent, $b =$ the amount of sorbed compound present in the activated carbon, and $c =$ the quantity of solvent to be contacted with the carbon bed.

2. The method of claim 1 wherein the sorbed compound is acetic acid and the solvent is ethyl acetate.

3. The method of claim 2 wherein the predetermined concentration is 50g. of acetic acid per liter of ethyl acetate.

4. The method of claim 1 wherein the sorbed compound is a phenol.

5. The method of claim 1 wherein the sorbed compound is an aliphatic acid.

6. The method of claim 1 wherein the sorbed compound is an aromatic acid.

7. The method of claim 1 wherein the sorbed compound is an alcohol.

8. The method of claim 5 wherein the sorbed aliphatic acid is acetic acid and the solvent is acetone.

9. The method of claim 5 wherein the sorbed aliphatic acid is acetic acid and the solvent is methanol.

10. A method of regenerating activated carbon containing a sorbed organic compound from the group consisting of aliphatic acids, aromatic acids, alcohols and phenols by contacting said carbon with an organic solvent for said compound comprising:

a. contacting the activated carbon with a regenerant solution containing a concentration of said compound in said solvent, said concentration being equal to the maximum concentration of said compound in said solvent which removes essentially as much of said compound per unit volume as would a unit volume of pure solvent, wherein said concentration is calculated by the formula $X = a - b/c$, wherein $X =$ the concentration of the sorbed compound in the solvent, $a =$ the solubility of the sorbed compound in the solvent, $b =$ the amount of sorbed compound present in the activated carbon, and $c =$ the quantity of solvent to be contacted with the carbon bed, b. removing the spent regenerant solution from the activated carbon, c. separating the spent regenerant solution into at least two fractions consecutively with the spent regenerant flow, d. treating the first fraction of the spent regenerant to separate the organic compounds from the solvent, e. combining the remaining fraction of the spent regenerant with sufficient solvent to produce a fresh regenerant of said concentration, and f. contacting the activated carbon with said fresh regenerant solution.

* * * * *